United States Patent [19]

Ruetman et al.

[11] Patent Number: 4,956,438
[45] Date of Patent: Sep. 11, 1990

[54] BULK POLYURETHANE IONOMERS

[75] Inventors: Sven H. Ruetman, Walnut Creek; Joginder N. Anand, Clayton, both of Calif.

[73] Assignee: The Dow Chemical Company, Midland, Mich.

[21] Appl. No.: 308,350

[22] Filed: Feb. 8, 1989

[51] Int. Cl.$^5$ .............................................. C08G 18/12
[52] U.S. Cl. .......................................... 528/60; 528/65
[58] Field of Search ................................... 528/60, 65

[56] References Cited

U.S. PATENT DOCUMENTS

| | | | |
|---|---|---|---|
| 3,412,054 | 11/1968 | Milligan et al. | 524/591 |
| 3,479,310 | 11/1969 | Dieterich et al. | 524/591 |
| 3,635,904 | 1/1972 | Briggs et al. | 528/77 |
| 3,870,684 | 3/1975 | Witt et al. | 524/591 |
| 4,092,286 | 5/1978 | Noll et al. | 524/591 |
| 4,124,574 | 11/1978 | Preston et al. | 528/76 |
| 4,237,264 | 12/1980 | Noll et al. | 528/67 |
| 4,305,858 | 12/1981 | Reischl | 528/65 |
| 4,312,973 | 1/1982 | Critchfield et al. | 528/75 |
| 4,376,834 | 3/1983 | Goldwasser et al. | 521/159 |
| 4,385,133 | 5/1983 | Alberino et al. | 521/159 |
| 4,408,008 | 10/1983 | Markusch | 524/591 |
| 4,501,852 | 2/1985 | Markusch et al. | 524/591 |
| 4,547,561 | 10/1985 | Wegner | 528/60 |
| 4,554,308 | 11/1985 | Russiello | 524/591 |
| 4,621,113 | 11/1986 | Collins | 524/196 |
| 4,743,673 | 5/1988 | Johnston et al. | 528/60 |
| 4,745,151 | 5/1988 | Noll et al. | 524/591 |
| 4,764,553 | 8/1988 | Mosbach et al. | 524/591 |
| 4,777,224 | 10/1988 | Gorzynski et al. | 525/454 |

OTHER PUBLICATIONS

Bazuin et al., "Modification of Polymer Properties Through Ion Incorporation", Ind. Eng. Chem. Prod. Dev., 20, 271–286 (1981).

*Primary Examiner*—Maurice J. Welsh
*Assistant Examiner*—Rabon Sergent

[57] ABSTRACT

The invention relates to bulk polyurethane ionomers prepared by the reaction (A) an isocyanate terminated ionic prepolymer with (B) a hydrocarbon polyol chain extender, said prepolymer having been prepared from (i) an excess of diisocyanate, (ii) a mixture comprising a diol and an organic polyol having three or more reactive hydroxyl moieties each having a molecular weight of from about 250 to about 6,000 and (iii) a difunctional isocyanate-reactive component containing an ionic group or potential ionic group.

17 Claims, No Drawings

BULK POLYURETHANE IONOMERS

BACKGROUND OF THE INVENTION

This invention relates to a bulk polymerized ionic polyurethane and is more particularly concerned with improved bulk polymerized ionic polyurethanes whose soft segment polyol component comprise high levels of triols along with the conventional diols.

Bulk polymerized polyurethanes are prepared in the absence of solvents. Such polyurethanes may be polymerized by an oneshot process wherein all of the ingredients are contacted under polymerization conditions. Alternatively, such polyurethanes may be prepared by a prepolymer process, wherein the polyol and isocyanate components are reacted such that an excess of isocyanate groups are present. Thereafter the prepolymer is reacted with a chain extender to form the polymer. The bulk polyurethanes may be polymerized into a final shape or processed into another form after polymerization. The bulk polyurethanes are useful in preparing shaped articles, films and in laminates.

Bulk polyurethanes do not exhibit the toughness which is required for some uses. Further, bulk polyurethanes do not demonstrate the adhesion properties desired for certain laminate applications.

What is needed is a bulk polyurethane with improved toughness and adhesion properties.

SUMMARY OF THE INVENTION

The invention relates to bulk polyurethane ionomers prepared by the reaction of (A) an isocyanate terminated ionic prepolymer with (B) a hydrocarbon polyol chain extender, said prepolymer having been prepared from (i) an excess of diisocyanate, (ii) a mixture comprising a diol and an organic polyol having three or more reactive hydroxyl moieties each having a molecular weight of from about 250 to about 6,000 and (iii) a difunctional isocyanate-reactive component containing an ionic group or potential ionic group.

The bulk polyurethanes of this invention demonstrate improved toughness and tensile properties and improved adhesion properties.

DETAILED DESCRIPTION OF THE INVENTION

The term "hydrocarbon" as used herein with respect to the polyol chain extender component means a hydrocarbon residue having from about 2 to about 20 carbon atoms remaining after the replacement of the appropriate number of hydrogen atoms by primary or secondary hydroxy groups: inclusive of said hydrocarbon residue are aliphatic groups of $C_2$ to $C_{10}$, cycloaliphatic groups of $C_5$ to $C_{18}$, aromatic groups of $C_6$ to $C_{20}$, and the like.

The term "aromatic diisocyanate" means an organic isocyanate containing one or two aromatically bound isocyanate groups wherein the aromatic divalent residue is an arylene or alkoxylene moiety having from about 6 to about 20 carbon atoms, inclusive, such as phenylene, benzylene, napthylene and the like.

The term "aliphatic diisocyanate" means an organic isocyanate containing two aliphatically bound isocyanate groups wherein the aliphatic divalent residue is an alkylene radical having from about 6 to about 12 carbon atoms, inclusive, such as hexamethylene, heptamethylene, octamethylene, nonamethylene, decamethylene, undecamethylene, dodecamethylene, and isomeric forms thereof.

The term "cycloaliphatic diisocyanate" means an organic diisocyanate containing two cycloaliphatically bound isocyanate groups wherein the cycloaliphatic divalent residue contains one or two cycloalkylene radicals each cycloalkylene having from about 5 to about 8 carbon atoms, inclusive, such as cyclopentylene-1,3, 4-methylcyclopentylene-1,3, cyclohexylene-1,3, cyclohexylene-1,4, 2-methylcyclohexylene-1,4, 2,5-dimethylcyclohexylene-1,4, cycloheptylene-1,3, cycloheptylene-1,4, 6-methylcycloheptylene-1,4, cyclooctylene-1,3, cyclooctylene-1,4, cyclooctylene-1,5, and the like: 4,4'-methylenebis(cyclohexylene), 4,4'-isopropylidenebis(cyclohexylene), 4,4'-dicyclohexylene, and the like.

The term "difunctional isocyanate-reactive component" means any organic compound carrying two separate groups each capable of reacting with an isocyanate group because of active hydrogens according to the Zerewitinoff test, such as —OH, —NH$_2$, —SH, —COOH, and the like.

The term "ionic group or potential ionic group" means a group either already in an anionic or cationic form or else, by neutralization with a reagent, readily converted to said anionic or cationic form respectively. Illustrative of such potential anionic groups (and neutralized form) are —COOH(—COO$^\ominus$), —SO$_2$OH(—SO$_2$O$^\ominus$), and =POOH(=POO$^\ominus$); illustrative of such potential cationic groups (and neutralized form) are ≡N(≡N—$^\oplus$), ≡P(≡P—$^\oplus$), and =S(=S—$^\oplus$).

The permanent set properties of the bulk polyurethanes remain relatively constant in spite of the films' increase in Shore A hardness and modulus properties.

The preparation of the bulk polyurethanes of this invention is carried out using any of the conventional methods and ingredients known to those skilled in the art except for the novel use of the triol and the difunctional isocyanate-reactive component containing an ionic group or potential ionic groups which will be discussed in detail below. Typical preparative methods are disclosed in the U.S. Pat. No. 4,621,113 which is incorporated herein by reference. Generally speaking, the bulk polyurethanes are preferably prepared by a two-stage process wherein a isocyanate-terminated prepolymer (A) is made in the first stage followed by chain-extending or finalizing the polymer formation in the second stage with a hydrocarbon polyol (B) defined above. The ionic portions of the bulk polyurethanes are preferably incorporated as part of the first stage prepolymer and will be discussed in detail below.

The diisocyanates (i) which can be employed for the isocyanate terminated prepolymer (A) preparation are defined above. Illustrative but non-limiting of the diisocyanates are 1,6-hexamethylene diisocyanate, 1,7-heptamethylene diisocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2,4-trimethylhexamethylene diisocyanate, 2,4,4-trimethylhexamethylene diisocyanate, and the (3-isocyanatopropoxy)-(3-isocyanatopropyl)arylenes such as 1-(3-isocyanatopropoxy)-4-(3-isocyanatopropyl)benzene described in U.S. Pat. No. 4,051,166, 1,4-bis(2-isocyanatoethyl)cyclohexane, and the like; isophorone diisocyanate otherwise identified as 1-isocyanato-3-isocyanatomethyl-3,5,5-trimethylcyclohexane; and cycloaliphatic diisocyanates such as methylenebis(cyclohexyl isocyanate)

including the 4,4'-isomer, the 2,4'-isomer, and mixtures thereof, and all the geometric isomers thereof including trans/trans, cis/trans, cis/cis and mixtures thereof, cyclohexylene diisocyanates (1,2-; 1,3-: or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, 1,4-diisocyanatocycloheptylene, 1,4-diisocyanatocyclooctylene, and the like. Aromatic diisocyanates include 2,4- and 2,6-tolylene diisocyanate and mixtures of these isomers, 1,3- and/or 1,4-phenylene diisocyanate, 2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'- and/or -4,4'-diisocyanate and, naphthylene-1,5-diisocyanate.

Preferred as a group are the aliphatic and cycloaliphatic diisocyanates. More preferred as a group are the cycloaliphatic diisocyanates and preferred within this group are the methylenebis(cyclohexyl isocyanates) with the 4,4'-isomer being particularly preferred.

The organic diols (ii) can be any of the high molecular weight diols described in the incorporated references above. Preferably, the molecular weight falls in the range of from about 500 to about 6,000, more preferably, from about 1,000 to about 3,000. The term "molecular weight" as used herein means the number average molecular weight as determined by end-group analysis or other colligative property measurement.

Exemplary of the diols which can be employed are: polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with difunctional amine-terminated polyethers and amino-terminated polybutadiene-acrylonitrile copolymers.

Illustrative of polyether diols are polyoxyethylene glycols, polyoxypropylene glycols, polyoxybutylene glycols which, optionally, have been capped with ethylene oxide residues, random and block copolymers of ethylene oxide, propylene oxide, and butylene oxide, random and block copolymers of tetrahydrofuran and ethylene oxide and or propylene oxide, and products derived from any of the above by reaction with difunctional carboxylic acids or esters derived from said acids in which latter case ester interchange occurs and the esterifying radicals are replaced by polyether polyol radicals. The preferred polyether polyols are random and block copolymers of ethylene and propylene oxide of functionality approximately 2.0 and polytetramethylene glycol polymers.

Illustrative of polyester diols are those prepared by polymerizing ε-caprolactone using an initiator such as ethylene glycol, ethanolamine and the like, and those prepared by esterification of polycarboxylic acids such as phthalic, terephthalic, succinic, glutaric, adipic, azelaic and the like acids with dihydric alcohols such as ethylene glycol, butanediol, cyclohexanedimethanol and the like.

Illustrative of the amine-terminated polyethers are the aliphatic primary diamines structurally derived from polyoxypropylene glycols. Polyether diamines of this type are available from Texaco under the trademark JEFFAMINE.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the dihydroxy-terminated polybutadiene copolymers are the compounds available under the trade name Poly BD Liquid Resins from Arco Chemical Company. Illustrative of the dihydroxy- and diamine-terminated butadiene/acrylonitrile copolymers are the materials available under the trade name HYCAR hydroxyl-terminated (HT) Liquid Polymers and amine-terminated (AT) Liquid Polymers, respectively.

The most preferred diols comprise the preferred random and block polyether diols and polytetramethylene glycols set forth above otherwise referred to as polyalkyleneoxy diols and with polyethyleneoxy-capped polypropyleneoxy diols being most specifically preferred.

Preferably the molar ratios of the diol and polyol (1) to the diisocyanate (X+Y) to the component containing an ionic or potential ionic group (Z) to the chain extender (X-1-Z) is represented by the formula 1/X+Y/Z/X-1-Z wherein X is between about 2.0 and about 9.0; Z is between about 0.25 and about 7.0; Y is between about 0 and 0.10; with the proviso that $X+Z \geq 1+Y+(X-1-Z)$. X is the molar ratio of diisocyanate equal to the molar ratios of the isocyanate reactive components. Y is the excess diisocyanate over that amount which is equal to the molar ratios of isocyanate reactive components. Preferably there is an excess of diisocyanate of about 3 to 5 percent, that is Y is 0.03 to 0.05.

One point of novelty in the present invention resides in the replacement of a portion of the above diol component with an organic polyol having three or more reactive hydroxyl moieties (polyfunctional polyol) having a molecular weight of from about 250 to about 6,000, preferably from about 500 to about 3,000, and most preferably from about 500 to about 2,000. Accordingly, the component (ii) for preparing said isocyanate terminated ionic prepolymer comprises a mixture of at least one diol with at least one polyol with more than three or more reactive hydroxyl groups. The proportions in which the triol is to be employed will vary somewhat according to its molecular weight. Branching and eventual cross-linking of the final polymer will be controlled largely by the molecular weight factor. As molecular weight of the polyfunctional polyol decreases, then branching in the prepolymer leading to possible cross-linking therein, and, most assuredly, in the final polyurethane will occur. Accordingly, the ultimate film properties desired will dictate polyfunctional polyol molecular weight and the proportions in which to use it. Advantageously, the polyfunctional polyol can be present in the mixture in up to about 50 hydroxyl equivalent percent. That is to say, of the total hydroxyl equivalents employed in the prepolymer preparation, up to about 50 percent can be contributed by the polyfunctional polyol component. Above the 50 percent level the thermoplastic nature of the bulk polyurethanes may be lost. Preferably, the polyol mixture (ii) comprises from about 5 to about 50 equivalent percent of said polyfunctional polyol and from 95 to 50 percent of said diol. More preferably, the polyfunctional polyol falls in a range of from about 10 to about 40 percent with diol being 90 to 60 percent.

The polyfunctional polyol can be any of the organic polyols known in the urethane art to be polyhydric in functionality, i.e., have three or more reactive hydroxyl moieties and which fall into the molecular weight ranges set forth above. The polyfunctional polyols can be identically obtained to those diols described above except for the use of initiators and starting materials leading to functionality of three or more. Examples of such initiators include glycerol, trimethylol propane, 1,2,6-hexane triol, 1,2,4-butane triol, trimethylol ethane, pentaerythritol, mannitol and sorbitol, and methyl glycoside. Preferred polyfunctional polyols are the triols. Polyether triols are readily available or easily prepared in the form of polyoxyethylene triols, polyoxypropylene triols, polyoxybutylene triols, the latter two optionally capped with ethyleneoxy residues, including random and block copolymers. All of these polyether triols are generically identified as polyalkyleneoxy triols and are prepared by the reaction of the corresponding ethylene, propylene, butylene oxides with trifunctional initiators such as glycerine, trimethylolpropane, and the like: optionally, the triols can be prepared from tetrahydrofuran and a trifunctional starter to yield the corresponding polytetramethyleneoxy triols; polyester triols while more difficult to synthesize with the overall trifunctionality than the polyalkyleneoxy triols above, are nevertheless still useful as triol components; typical trifunctional polyester triols are those prepared from ε-caprolactone with an initiator such as glycerine, trimethylolpropane and the like; further illustrative examples of triols include polycarbonate triols prepared by reaction of triols such as trimethylolpropane or glycerine with diphenylcarbonate or phosgene; and mixtures of any of the above triols as the major component (greater than 50% w/w) with tri-functional amine-terminated polyethers.

A preferred class of triols comprises the polyalkyleneoxy triols, particularly those having a molecular weight of from about 500 to about 3,000. Even more preferred are the polyethyleneoxy-capped polypropyleneoxy triols having a molecular weight from about 500 to about 2,000.

Known difunctional chain extenders may be used in this invention, such as the aliphatic $C_2$ to $C_{10}$ diols as typically exemplified by ethylene glycol, 1,4-butanediol, 1,3-propane diol, 1,5-pentane diol, 1,6-hexanediol, and the like.

The difunctional isocyanate-reactive components (iii) contain an ionic group or potential ionic group as defined above and include any of those compounds disclosed in U.S. Pat. 4,408,008, particularly column 6, line 63 through column 7, line 57 whose disclosure with respect to these compounds is incorporated herein by reference. Additionally, the U.S. patent disclosures recited in this referenced disclosure including U.S. Pat. Nos. 3,479,310; 3,419,533: 3,412,054; and 4,108,814 are also incorporated herein by reference with respect to the difunctional isocyanate-reactive ionic or potential ionic compounds disclosed.

As noted and defined above, the ionic definition includes both anionic and cationic character. Additionally, the term "neutralize" as used herein for converting potential ionic to ionic groups refers not only to neutralization using true acids and bases but also includes quaternarization, and ternarization. The potential anionic groups typically include carboxylic acid groups, sulfonic acid groups, and phosphoric acid groups which when incorporated into the difunctional isocyanate-reactive component (iii) can be neutralized before, during, or after the prepolymer formation to form the corresponding carboxylate anion, sulfonate anion, and phosphate anion by treatment with such inorganic or organic bases as sodium hydroxide, potassium hydroxide, potassium carbonate, ammonia, tertiary amines such as triethylamine, tripropylamine, tributylamine, triethylene diamine, and the like. In respect of the potential cationic groups, these typically include tertiary amine, phosphine, and sulfide groups which when incorporated into the difunctional isocyanate-reactive component (iii) can be quaternated or ternated as the case may be by neutralization or quaternarization of the tertiary amine, or reacting the phosphine or sulfide with compounds capable of alkylating the phosphine or sulfide groups. Sometimes it is more convenient to have the precursor phosphine or sulfide groups as a separate reagent with the actual quaternizing or ternarizing moiety in the difunctional component (iii).

The isocyanate-reactive groups themselves as defined above are those having active hydrogen atoms and include hydroxyl, amino, thiol, and carboxylic acid. Preferred of the functional groups are the dihydroxy and diamino compounds with dihydroxy functionality most preferred.

Illustrative but non-limiting of the compounds containing a potential anionic (ionic) group are tartaric acid (mono-, or di-sodium salt), 2,6-dihydroxy benzoic acid (sodium salt, potassium salt, triethylammonium salt), 2,8-dihydroxynaphthoic acid-3 (sodium salt, potassium salt, triethylammonium salt), 3,4-diaminobenzoic acid (sodium salt, potassium salt, triethylammonium salt), 1,7-dihydroxynaphthalenesulfonic acid-3 (sodium salt, potassium salt, triethylammonium salt), 1,8-dihydroxynaphthalenedisulfonic acid-2,4 (sodium salt, potassium salt, triethylammonium salt), 2,4-diaminotoluenesulfonic acid-5 (sodium salt, potassium salt, triethylammonium salt), the sulfonate diols described in U.S. Pat. No. 4,108,814 (incorporated herein by reference), bis(β-hydroxyethyl)phosphinic acid (sodium salt, potassium salt, triethylammonium salt), and the like; illustrative of the compounds containing a potential cationic (ionic) group are methyldiethanolamine (hydrochloride salt, acetic acid salt), N,N-di(2-hydroxypropyl)aniline (hydrochloride salt, acetic acid salt), N-cyclohexyl-N-(3-aminopropyl)propanol-2-amine (hydrochloride salt, acetic acid salt), ethyldiethanolamine (hydrochloride salt, acetic acid salt), glycerol-α-bromohydrin quaternated with tributylamine (ammonium salt), or triethyl phosphine (phosphonium salt), glycerol-α-bromohydrin ternated with dimethyl sulfide (sulfonium salt), and the like.

Preferred for the component (iii) is a class of dihydroxy alkanoic acids described in U.S. Pat. No. 3,412,054 (incorporated herein by reference). When they are neutralized with any of the inorganic or organic bases discussed in the incorporated references and also above, they result in the preferred anionic moieties. Accordingly, the preferred component (iii) is a carboxylic acid containing diol which can be neutralized with an inorganic or organic base to form said ionic group before, during or after said prepolymer formation. The most preferred dihydroxy alkanoic acids are the α,α-dimethylol alkanoic acids having the formula $QC(CH_2OH)_2COOH$ wherein Q is hydrogen or $C_1$ to $C_8$ alkyl (preferred are those acids with $C_1$ to $C_4$). Preferred as the neutralizing agents are the aliphatic $C_2$ to $C_4$ tertiary amines inclusive of triethylamine, tripropylamine, tributylamine, triisopropylamine, triethylene diamine, and the like, and aqueous or anhydrous ammonia.

The proportions in which component (iii) is to be employed are not particularly critical except to the extent that it be sufficient to result in enhanced adhesive properties of the prepolymer and final polyurethane. Advantageously, the component is employed within a range of proportions such that the milliequivalents of ionic groups per 100 grams of prepolymer (A) falls within a range of from about 2 to about 150, preferably about 10 to 100, most preferably about 15 to 80. The equivalent weight of the ionic component is the precursor molecular weight divided by the number of ionic groups. Accordingly, the proportion of (iii) employed divided by its equivalent weight and multiplied by 1,000 provides the ultimate milli-equivalents of potential and/or ionic groups present in the total prepolymer weight.

The isocyanate terminated prepolymer (A) as noted above is readily prepared using the conventional procedures already incorporated herein. The polyurethanes of this invention are prepared in the absence of a solvent or diluent. The excess diisocyanate (i) along with the polyol mixture (ii) and the difunctional isocyanate-reactive component (iii) are brought together in any convenient manner, preferably under the exclusion of moisture. This is best achieved by reacting the components under an inert gas such as nitrogen or argon. It is also preferred to react the components in the absence of water. In a preferred embodiment the isocyanate reactive components of (ii) and (iii) are first thoroughly blended together followed by the excess diisocyanate.

The exact proportion of excess of isocyanate is chosen so that the final polymer properties desired will be obtained. Advantageously, the proportions of (i), (ii) which includes both diol and polyfunctional polyol, and (iii) are such that the ratio of isocyanate equivalents to total isocyanate-reactive equivalents in said prepolymer (A) falls in a range of from about 1.1 to about 3, preferably from about 1.2 to 2.

The reaction temperature during prepolymer formation is normally maintained below about 150° C. Generally speaking, the reactants will be heated to a temperature within the range of about 30° C. to about 125° C., preferably about 50° C. to 100° C. In some cases, reaction exotherm will provide heat thereby contributing to these temperature ranges.

Catalysts for the reaction of the polyether and chain extender with the polyisocyanate are advantageously used. Conventional urethane forming catalysts are preferred. Preferred catalysts include organometallic catalysts, especially organotin catalysts, and tertiary amine compounds. The preferred organotin catalysts include, for example, stannous octoate, dimethyltindilaurate, dibutyltindilaurate and the like. Preferable tertiary amine catalysts include triethylenediamine. About 0.001 to about 0.5 part of the organometallic catalyst is advantageously used per 100 parts of reactive components. Tertiary amine catalysts are suitably employed in an amount from about 0.01 to about 2 parts per 100 parts of reactive components. Of course, other catalysts useful in catalyzing polyurethane reactions are also useful herein.

The reaction time for the formation of the prepolymer may be any time sufficient to form the prepolymer. Preferably the reaction time is between about 0.5 and about 5 hours, with between about 1 and about 3 hours more preferred.

Completion of the bulk polyurethane formation, otherwise known as chain extension is readily accomplished by mixing the prepolymer (A) with the chain extender (B) neat. Efficient intermixing of the components is highly desirable.

Preferably the prepolymer and chain extender are reacted with mixing at ambient or elevated temperatures until a homogeneous continuous mass is formed This reaction is exothermic. Heating speeds up this reaction. Temperatures from about 15° to about 55° C. are preferred for this step. After a homogeneous continuous mass is formed, the reaction mixture is exposed to elevated temperatures to complete the polymerization. The temperatures used for completion of the polymerization are those temperatures at which polymerization goes to completion at a reasonable rate. The upper limit is that temperature at which the polyurethane undergoes degradation. Preferable temperatures are between about 55° and about 220° C. with between about 60° and about 150° being preferred, and between about 80° and about 110° C. being more preferred. The polymerization completion step is continued for sufficient time to complete the polymerization. The time is dependent on the temperature used, the catalyst amount, and final properties desired. Preferable times are between about 30 seconds and 16 hours.

The proportion of extender (B) employed is governed by the isocyanate content of the prepolymer component. Generally speaking, the proportions of (B) are such that the ratio of isocyanate equivalents in (A) to extender equivalents in (B) falls in a range of from about 1.25 to about 0.90, and preferably from about 1.10 to 0.95.

It is preferable to perform the chain extension under an inert or a dry atmosphere, as the presence of water during this stage may deleteriously affect the properties of the final polymer. Preferably a polyurethane catalyst is added to the reaction mixture during the chain extension step. Those polyurethane catalyst described hereinbefore may be used. Preferably the catalyst is added after the prepolymer and chain extender have been contacted and mixed for a time sufficient to allow dispersion of the components in one another. The catalyst is used in an amount which facilitates the formation of the polyurethane over a reasonable time frame. Preferable catalyst amounts are between about 0.01 mg and about 0.08 mg per 100 parts of reactive components, with between about 0.02 mg and about 0.06 mg being preferred.

If the bulk polyurethane is to undergo a neutralization, quaternarization or ternarization step, whatever the case may be, it should be performed before chain extension. Therefore, the neutralizing acid, base, alkylating agent, or whatever as required to convert the potential ionic group to its ionic form is added to the rapidly stirred prepolymer in sufficient amount to react with at least about 75 percent, preferably at least about 90 percent of the potential ionic moieties.

The physical properties of the final polymers obtained whether in the form of films, coatings, or even stoving lacquers can vary. Such properties include tensile properties, abrasion resistance, solvent resistance, water absorption, etc. The bulk polyurethanes preferably have tensile properties of about 1500 psi or greater, and more preferably 2500 psi or greater. Such polyurethanes preferably have an abrasion resistance of no more than 25 percent delta haze after 600 strokes (ASTM F-735). The bulk polyurethanes preferably demonstrate solvent resistance after 100 methyl ethyl ketone double rubs. The bulk polyurethanes preferably exhibit a water absorption of four percent or less, more preferably two percent or less. Such bulk polyurethanes preferably demonstrate a permanent set of 50 percent or less, more preferably 25 percent or less. Using extenders of functionality greater than 2 in combination with prepolymers having the highest isocyanate contents results in the harder thermosets due to the high hard segment content of the polymer and cross-linking. This is particularly true when the soft segments in the prepolymer are derived from the lowest molecular weight polyols. The terms "soft and hard segments" refer to the polymer linkages derived from the diisocyanate component with the high molecular weight polyols (ii) and with the extender (iii) respectively. Reversing all of the above conditions leads to the softer materials.

The polyurethanes can be modified further by the addition of colorants, antioxidants, UV stabilizers, fillers, fire-retardants, antistatic agents and the like known to those skilled in the art.

The bulk polyurethanes may be pressure molded into desired shapes. Alternatively they may be extruded into desired forms, for example into films or sheets. The films or sheets may be laminated to substrates. Alternatively the polyurethanes may be coextruded with a desired substrate.

In a pressure molding application the polyurethane is placed into a mold of the desired shape and heated to a temperature at which the polyurethane is flowable, preferably between about 130° and about 190° C., more preferably between about 145° and about 170° C. Thereafter the polyurethane is exposed to sufficient pressure to mold the polyurethane to the desired shape, preferable pressures are between about 25,000 lb/in$^2$ and about 70,000 lb/in$^2$, with between about 50,000 and about 60,000 lb/in$^2$ being more preferred.

The excellent properties of the films include good clarity, high gloss, good weather resistance including water repellency, abrasion resistance, and the like. This makes them particularly useful in the manufacture of waterproof clothing, tarpaulins, chip-resistant coatings in automotive applications such as protective coatings applied after a car has been painted, as coatings for high grade paper, and the like. The present films provide excellent protective coatings on aircraft acrylic canopies and in ballistic glazing applications.

The above utilities can be achieved without the need for using organic solvents which, for the most part, are required in the prior art coatings. Of even more significance is the fact that the present polymers can be prepared with increasing hardness and stiffness values while at the same time keeping relatively constant permanent set properties. Heretofore, this has not been possible. Accordingly, the present compositions are provided with increased hardness and tensile modulus properties without having to resort to the need of higher hard segment linkages derived from higher diisocyanate concentrations.

SPECIFIC EMBODIMENTS OF THE INVENTION

The following examples illustrate the invention and are not to be construed as limiting. All parts and percentages are by weight unless otherwise stated.

Example 1

Into a dry 1-liter round-bottom flask, equipped with mechanical stirrer, thermometer and gas inlet/outlet tubes, is added 209.6 g (0.21 eq. wt.) of polypropylene oxide diol (eq. wt. 998) and 20.5 g (0.09 eq. wt.) of polypropylene oxide triol (eq. wt. 228). The mixture is heated under vacuum at 135° C. for one hour. The temperature is lowered to 80° C. and 20.1 g (0.30 eq. wt.; 0.15 mole) of 2,2-bis(hydroxymethyl)propionic acid, 162.1 g (1.236 eq. wt.) of 4,4-methylene bis(cyclohexyl isocyanate) and 30 µl of stannous octoate are added. The mixture is heated at 100° C. for 2 hours under a nitrogen blanket. The mixtures cooled to 80° C. and 26.7 g (0.144 mole) of tributylamine is added. The stirring is continued for 20 minutes. 1.7 g of octadecyl-3,5-ditertbutyl-4-hydroxy-hydrocinnamate (Irganox 1076 stabilizer) is added and stirring continued for 5 minutes. The mixture is cooled to 30° C. and 27.0 g (0.60 eq. wt.) of 1,4-butanediol and 194 µl of stannous octoate is added. A slow exotherm starts. When the temperature reaches 50° C., the mixture is poured into a polypropylene tray and heated in an air oven at 100° C. for 12 hours.

The bulk ionomers are compression molded at 165° C. to uniform, transparent sheets by the following procedures. The rubbery polyurethane ionomer sheets are cut into small pieces and placed between two metal sheets, which have previously been coated with RELEASE ALL #100 (Airtech International, Inc.) mold release. The metal sheets with samples are placed in a press at 166° C. and the following pressure cycle is used:

10 min. at 500 lb/in$^2$
5 min. at 2500 lb/in$^2$
15 min. at 60000 lb/in$^2$.

The tensile properties are determined on Instron Model 4206 according to ASTM D1708084. The results from this study are compiled in Table I.

Example 2 - Not an Example of the Invention

A bulk polyurethane is prepared using the process described in Example 1 using the following materials; 180 g of polypropylene oxide diol (eq. wt. 998), 12.1 g 2,2-bis(hydroxymethyl)propionic acid, 97.5 g of 4,4-methylene bis(cyclohexyl isocyanate), 18 µl stannous octoate (for prepolymer step) 1 g octadecyl-3,5-ditertbutyl-4 hydroxy hydrocinnamate, 16.3 g 1,4-butanediol, and 117 µl stannous octoate (for chain extension step).

Sample are prepared and tested for tensile properties as described in Example 1. The results are compiled in Table I.

Example 3 - Not an Example of the Invention

A bulk polyurethane is prepared using the process described in Example 1 using the following materials: 180.1 g of polypropylene oxide diol (eq. wt. 998), 12.1 g 2,2-bis(hydroxymethyl)propionic acid, 97.6 g of 4,4-methylene bis(cyclohexyl isocyanate), 18 pl stannous octoate (for prepolymer step), 11.2 g N,N-diisopropylethylamine, 1 g octadecyl-3,5-ditertbutyl-4 hydroxy hydrocinnamate, 16.3 g 1,4-butanediol, and 117 μl stannous octoate (for chain extension step).

Samples are prepared and tested for tensile properties as described in Example 1. The results are compiled in Table I.

Example 4

A bulk polyurethane is prepared using the process described in Example 1 using the following materials: 171.0 of polypropylene oxide diol (eq. wt. 998), 2.1 g of polypropylene oxide triol (eq. wt. 228), 12.1 g 2,2-bis(hydroxymethyl)propionic acid, 97.6 g of 4,4-methylene bis(cyclohexyl isocyanate), 18 μl stannous octoate (for prepolymer step), 11.2 N,N-diisopropylethyl amine, 1.0 g octadecyl-3,5-ditertbutyl-4 hydroxy hydrocinnamate, 16.3 g 1,4-butanediol, and 117 μl stannous octoate (for chain extension step).

Samples are prepared and tested for tensile properties as described in Example 1. The results are compiled in Table I.

Example 5

A bulk polyurethane is prepared using the process described in Example 1 using the following materials: 179.6 g of polypropylene oxide diol (eq. wt. 998), 4.6 g of polypropylene oxide triol (eq. wt. 228), 13.4 g 2,2-bis(hydroxymethyl)propionic acid, 108.1 g of 4,4-methylene bis(cyclohexyl isocyanate), 20 μl stannous octoate (for prepolymer step), 12.9 N,N-diisopropylethylamine, 1.1 g octadecyl-3,5-ditertbutyl-4 hydroxy hydrocinnamate, 18.0 g 1,4-butanediol, and 130 μl stannous octoate (for chain extension step).

Samples are prepared and tested for tensile properties as described in Example 1. The results are compiled in Table I.

Example 6

A bulk polyurethane is prepared using the process described in Example 1 using the following materials; 199.6 g of polypropylene oxide diol (eq. wt. 998), 11.4 g of polypropylene oxide triol (eq. wt. 228), 16.8 g 2,2-bis(hydroxymethyl)propionic acid, 135.1 g of 4,4-methylene bis(cyclohexyl isocyanate), 25 μl stannous octoate (for prepolymer step), 22.2 g tributylamine, 1.4 g octadecyl-3,5-ditertbutyl-4 hydroxy hydrocinnamate, 22.5 g 1,4-butanediol, and 162 μl stannous octoate (for chain extension step).

Samples are prepared and tested for tensile properties as described in Example 1. The results are compiled in Table I.

Example 7

A bulk polyurethane is prepared using the process described in Example 1 using the following materials: 179.6 g of polypropylene oxide diol (eq. wt. 998), 27.4 g of polypropylene oxide triol (eq. wt. 228), 20.1 g 2,2-bis(hydroxymethyl)propionic acid, 162.1 g of 4,4-methylene bis(cyclohexyl isocyanate), 30 μl stannous octoate (for prepolymer step), 26.7 tributylamine, 1.7 g octadecyl-3,5-ditertbutyl-4 hydroxy hydrocinnamate, 27.0 g 1,4-butanediol, and 194 μl stannous octoate (for chain extension step).

Samples are prepared and tested for tensile properties as described in Example 1. The results are compiled in Table I.

TABLE I

| Example | Equiv. % of Triol | Tensile Strength psi | Elongation, % | 300% Elongation Modulus psi | Set, % |
| --- | --- | --- | --- | --- | --- |
| 1 | 0 | 2211 | 883 | 374 | 27 |
| 2 | 0 | 1716 | 690 | 336 | 33 |
| 3 | 5 | 2085 | 744 | 350 | 42 |
| 4 | 10 | 1876 | 654 | 387 | 52 |
| 5 | 20 | 2535 | 591 | 431 | 48 |
| 6 | 30 | 2831 | 481 | 548 | 48 |
| 7 | 40 | 3060 | 363 | 815 | 46 |

What is claimed is:

1. A bulk polyurethane ionomer prepared by the reaction of (A) an isocyanate terminated ionic prepolymer with (B) a hydrocarbon polyol chain extender said prepolymer having been prepared from (i) an excess of a diisocyanate, (ii) a mixture comprising a diol and an organic polyol having three or more reactive hydroxyl groups each having a molecular weight of from about 250 to about 6,000 and (iii) a difunctional isocyanate-reactive component containing an ionic group or potential ionic group.

2. A bulk polyurethane ionomer according to claim 1 wherein the hydrocarbon polyol chain extender comprises a hydrocarbon diol, the diisocyanate comprises an aliphatic or cycloaliphatic diisocyanate, and the organic polyol is a triol.

3. A bulk polyurethane ionomer according to claim 2 wherein said chain extender comprises an alkylene diol.

4. A bulk polyurethane ionomer according to claim 3 wherein said diisocyanate (i) comprises a cycloaliphatic diisocyanate.

5. A bulk polyurethane ionomer according to claim 4 wherein said diisocyanate (i) comprises 4,4'-methylenebis(cyclohexyl isocyanate).

6. A bulk polyurethane ionomer according to claim 5 wherein said diol in (ii) comprises a polyalkyleneoxy diol having a molecular weight of from about 500 to about 6,000.

7. A bulk polyurethane ionomer according to claim 6 wherein said triol in (ii) comprises a polyalkyleneoxy triol having a molecular weight of from about 500 to about 3,000.

8. A bulk polyurethane ionomer according to claim 7 wherein said triol comprises a polyethyleneoxy capped polypropyleneox triol.

9. A bulk polyurethane ionomer according to claim 7 wherein said triol is present in up to about 50 hydroxyl equivalent percent of said mixture (ii).

10. A bulk polyurethane ionomer according to claim 9 wherein said (iii) is present in sufficient proportions to provide from about 10 to about 150 milliequivalents of ionic groups per 100 grams of said prepolymer (A).

11. A bulk polyurethane ionomer according to claim 10 wherein the proportions of said (i), (ii), and (iii) are such that the ratio of isocyanate equivalents to the total isocyanate-reactive equivalents in said prepolymer (A) falls in a range of from about 1.5 to about 3.

12. A bulk polyurethane ionomer according to claim 11 wherein the proportions of said isocyanate terminated prepolymer (A) and polyol chain extender (B) are such that the ratio of equivalents of isocyanate in (A) to hydroxy equivalents in (B) falls in a range of from about 1.25 to about 0.90.

13. A bulk polyurethane ionomer prepared by the reaction of

A. an isocyanate terminated ionic prepolymer prepared from
(i) a cycloaliphatic diisocyanate;
(ii) a polyol mixture comprising:
(a) a polyalkyleneoxy diol having a molecular weight of from about 500 to about 6,000: and
(b) a polyalkyleneoxy triol having a molecular weight of from about 500 to about 3,000 and wherein said triol can be present in up to about 50 hydroxyl equivalent percent of said mixture; and
(iii) a carboxylic acid containing diol wherein said acid is neutralized with a tertiary amine after said prepolymer formation to form said ionic function, wherein said (iii) is present in sufficient proportions to provide about 10 to about 150 milliequivalents of said ionic groups per 100 grams of said prepolymer and further, wherein the proportions of said (i), (ii), and (iii) are such that the ratio of isocyanate equivalents to the total isocyanate-reactive equivalents falls in a range of from about 1.1 to about 3; and B. a hydrocarbon diol wherein the proportions of said (A) and (B) are such that the ratio of equivalents of isocyanate in (A) to hydroxy equivalents in (B) falls in a range of from about 1.25 to about 0.90.

14. A bulk polyurethane ionomer according to claim 13 prepared by the reaction of
A. an isocyanate terminated prepolymer prepared from
(i) 4,4'-methylenebis(cyclohexyl isocyanate);
(ii) a polyol mixture comprising:
(a) a polyethyleneoxy-capped polypropyleneoxy diol having a molecular weight of about 1,000 to 3,000: and
(b) up to about 50 equivalent percent of said mixture of a polyethyleneoxy-capped polypropyleneoxy triol having a molecular weight of about 500 to 2,000; and
(iii) 2,2-bis(hydroxymethyl)propionic acid wherein said acid is neutralized with a tertiary amine after said prepolymer formation to form said ionic function, wherein said (iii) is present in sufficient proportions to provide about 20 to about 125 milliequivalents of said ionic groups per 100 grams of said prepolymer, and wherein the proportions of said (i), (ii), and (iii) provide for a ratio of isocyanate equivalents to the total isocyanate-reactive equivalents of about 1.2 to 2; and B. a $C_2$ to $C_4$ alkylene diol in sufficient proportions to provide a ratio of isocyanate equivalents from (A) to hydroxy equivalents from (B) of about 1.10 to 0.95.

15. A bulk polyurethane ionomer according to claim 14 wherein said (iii) is neutralized with triethylamine.

16. A bulk polyurethane ionomer according to claim 15 wherein said (B) comprises butane diol.

17. A bulk polyurethane ionomer according to claim 16 wherein said polyol mixture (ii) comprises a diol and triol mixture of molecular weights of about 2,000 and 700, respectively.

* * * * *